(12) United States Patent
Beringer

(10) Patent No.: US 10,000,280 B2
(45) Date of Patent: Jun. 19, 2018

(54) DEVICE FOR MOUNTING AN AIRCRAFT TAIL WHEEL

(71) Applicant: Beringer Aero, Tallard (FR)

(72) Inventor: Rémi Beringer, Tallard (FR)

(73) Assignee: Beringer Aero, Tallard (FR)

( * ) Notice: Subject to any disclaimer, the term of this patent is extended or adjusted under 35 U.S.C. 154(b) by 83 days.

(21) Appl. No.: 14/904,931

(22) PCT Filed: Jul. 17, 2014

(86) PCT No.: PCT/FR2014/051838
§ 371 (c)(1),
(2) Date: Jan. 13, 2016

(87) PCT Pub. No.: WO2015/011374
PCT Pub. Date: Jan. 29, 2015

(65) Prior Publication Data
US 2016/0167771 A1 Jun. 16, 2016

(30) Foreign Application Priority Data
Jul. 25, 2013 (FR) .................................... 13 57366

(51) Int. Cl.
*B64C 25/00* (2006.01)
*B64C 25/50* (2006.01)
*B60B 33/00* (2006.01)
*B60B 33/02* (2006.01)

(52) U.S. Cl.
CPC .......... *B64C 25/50* (2013.01); *B60B 33/0055* (2013.01); *B60B 33/0057* (2013.01); *B60B 33/0065* (2013.01); *B60B 33/025* (2013.01); *B60B 33/026* (2013.01); *B60B 33/0068* (2013.01); *B60B 33/0073* (2013.01); *B60B 2900/351* (2013.01)

(58) Field of Classification Search
CPC ... B64C 25/50; B64C 25/505; B64C 25/0055; B64C 25/0057
USPC ...................................................... 244/103 R
See application file for complete search history.

(56) References Cited

U.S. PATENT DOCUMENTS

| 2,263,717 | A | * | 11/1941 | Cleveland | B64C 25/505 16/21 |
| 2,329,823 | A | | 9/1943 | Camburn | |
| 2,403,383 | A | * | 7/1946 | Levy | B64C 25/50 244/104 FP |
| 2,494,482 | A | | 1/1950 | Maule | |
| 2,502,522 | A | * | 4/1950 | Hoobler | B64C 25/505 244/103 W |
| 2,506,178 | A | * | 5/1950 | Shaw | B64C 25/505 244/102 R |
| 2,508,351 | A | * | 5/1950 | Bjerke | B64C 25/505 244/103 R |

FOREIGN PATENT DOCUMENTS

| DE | 91 03 536 U1 | 6/1991 |
| GB | 527994 A | 4/1939 |

* cited by examiner

*Primary Examiner* — Richard G Davis
(74) *Attorney, Agent, or Firm* — Seed IP Law Group LLP

(57) ABSTRACT

A device for mounting an aircraft tail wheel includes a support plate having, on the one hand, an articulation shaft with an arm and, on the other hand, an articulation shaft with a fork receiving the freely rotating tail wheel, while the articulation shaft of the plate is positioned near a rotation shaft of the tail wheel.

5 Claims, 6 Drawing Sheets

DEVICE FOR MOUNTING AN AIRCRAFT TAIL WHEEL

BACKGROUND

Technical Field

The invention concerns the technical field of aviation and more particularly an aircraft tail wheel.

Description of the Related Art

In an embodiment well known to the man of the art, in the field of aviation, a landing gear is considered to be conventional when it includes at least two main running components placed ahead of the center of gravity, and a supporting wheel at the tail of the aircraft.

The parts of the main running components generally comprise one or several sets of wheels whereby the supporting tail wheel is more often than not made of a steerable wheel.

According to the technical art, the tail wheel is generally mounted free to rotate in a fork consisting of an arm, for instance in the form of a spring blade made integral with the tail of the aircraft. The fork itself is hinged at the end of the attaching arm. The axis of rotation of the wheel is placed behind the axis of articulation of the fork to create, in a known manner, a castor effect to improve the handling capability of the aircraft. Indeed, with conventional landing gear, because of the long distance between the main landing gear and the tail wheel, an aircraft is difficult to maneuver when taxiing. Therefore, to make a tight turn, it is necessary, for instance, to lock one of the wheels and allow the tail wheel to turn naturally through 90°.

Again, in a known manner, the tail wheel is connected, for instance, through a rudder bar, to springs or cables generally operable from the flight cockpit of the aircraft, to allow the orientation of the tail wheel.

However, this type of conventional landing gear is particularly unstable during taxiing. Indeed, the center of gravity is located behind the main landing gear. Accordingly, if there is a perturbation, caused, for instance, by a crosswind, the pilot must anticipate a deviation from the path by countering the effects of the wind with the rudder bar. This is a particularly tricky operation to perform, in that it can often result in loss of aircraft control in a ground loop, whereby the aircraft swivels about itself in the direction of the wind. Control by springs or cables is insufficiently rigid to prevent the tail wheel from locking under the force and thus decreasing the turn radius.

It is evident that this instability increases as a square of the speed. In an attempt to remedy this drawback, it has been proposed to connect the tail wheel to means able to lock it in the centerline of the aircraft. This solution resolves the issue of instability but does not correct the necessary path in the event of a crosswind, as indicated.

BRIEF SUMMARY

The invention aims at correcting these drawbacks in a simple, reliable, efficient and rational way.

The issue that the invention proposes to resolve is to allow the precise guidance of the aircraft on takeoff and landing, allowing tight maneuvers by locking, for instance, one of the main landing gear wheels.

It to resolve an issue like this, a device for mounting on an aircraft tail wheel has been designed and developed, mounted to an attaching arm made integral with said tail whereby the device includes, according to the invention, a support plate having on the one hand, an articulation shaft with said arm and, on the other hand, an articulation shaft with a fork receiving the freely rotating wheel.

Therefore, the characteristics mean that the tail wheel has a double articulation.

According to another advantageous characteristic of the invention, the support plate has means of locking the articulation shaft of the fork.

From these characteristics, it therefore transpires that in the unlocked position of the fork articulation shaft, the wheel is angularly free so that it has considerable deflection, allowing the aircraft the possibility of making a U-turn, with considerable maneuverability, and its easy storage in a hangar for instance.

With the fork in this unlocked position, the plate can still be controlled angularly with respect to the attaching arm. With the fork articulating shaft in the locked position, the issue of instability is resolved with precise guidance on takeoff and landing, if the centrifugal force has no influence on the turning angle of the tail wheel.

Advantageously, the locking means of the fork articulation shaft can be operated from the aircraft cockpit.

To resolve the issue of eliminating, or at least decreasing considerably the spurious force resulting from a lateral force, for instance a crosswind, the articulation shaft of the plate is placed vertically with respect to the tail wheel rotation shaft.

Advantageously, the two shafts are offset and arranged in parallel in the same alignment.

According to another characteristic, the articulation shaft of the fork is arranged upstream of the articulation shaft of the plate so that it is positioned inside a plane defined by the attaching arm.

To overcome the issue of instability, the plate is connected to a rudder bar for angular orientation.

In one embodiment, the means of locking the fork with respect to the plate consist of a pin mounted against a return spring and fitted to slide freely in a housing of the plate, thus being able to be engaged, in the locking position, in a part of the fork, with said pin being connected to a control cable operable from the cockpit.

Advantageously, the shafts are assembled free to rotate in the support plate with respect to the sealed running components.

BRIEF DESCRIPTION OF THE SEVERAL VIEWS OF THE DRAWINGS

The invention is described in the following in greater detail with reference to the illustrations of the attached figures in which.

DETAILED DESCRIPTION

Figure 1:
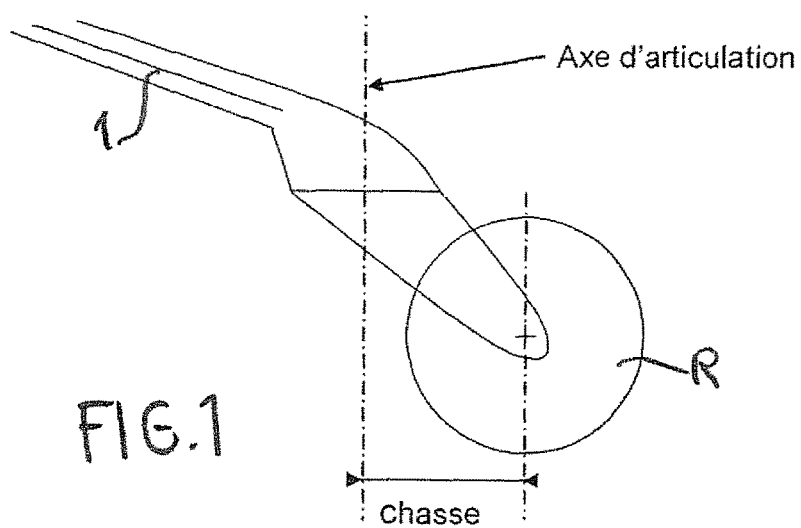
FIG. 1 is a schematic view showing the principle of the assembly of a tail wheel according to the prior art of the technique.
Figure 2:
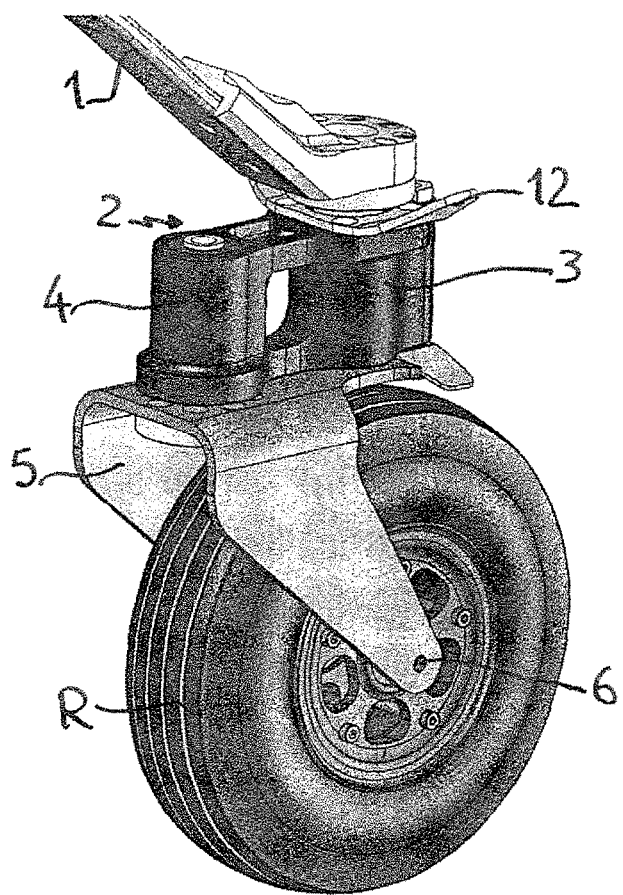
FIG. 2 is a perspective view of the overall device.

According to the invention, the desired goal is to assemble a tail wheel R on and attaching arm 1 made integral by any known and appropriate means with the tail of the aircraft in question.

The design of arm 1 is not described in detail because the arm is not a specific part of the invention. For instance, conventionally this arm consists of a spring leaf.

According to the invention, the assembly device includes a support plate 2 having, on the one hand, an articulation shaft 3 with arm 1 and, on the other hand, an articulation shaft 4 with a fork 5 receiving the freely rotating tail wheel R. By means of these arrangements, the assembly of the tail wheel R with respect to arm 1 is by means of a double articulation with major advantages as will be explained in the continuation of this description.

After assembly on the plate 2, the two axes 3 and 4, are offset and arranged in parallel in the same alignment. The articulation shaft 3 of the plate is arranged near the rotation shaft 6 of the tail wheel.

In the illustrated embodiment, the articulation shaft 3 is attached by any known and suitable means, for instance by screwing, to the free end of the attaching arm 1. The shaft 3 is mounted free to turn in a bore 2a of the plate connected to the sealed running components 7, comprising, for instance, ball bearings.

In the same way, the rotation shaft 4 of the fork 5 is coupled to said fork 5 by any known and are suitable means such as screwing, and is engaged to turn it freely in a bore 2b of plates 2 connected to the sealed running components 8. Therefore, it is evident that the plate is mounted free to rotate with respect to articulation arm 1 whereas tail wheel R is mounted free to rotate with respect to the plate 2.

According to one important characteristic, support plates 2 have means of locking the articulation shaft 4 of fork 5, that is, of tail wheel R. As shown more particularly in the FIGS. 3 and 4, these locking means consist of a mobile pin 9 mounted opposite a return spring 10. The pin 9 is mounted free to slide in a housing 2c of plate 2 being suitable for engaging, in the locking position, in a part with a hole 5a for instance, in a base plate 5b of fork 5. Pin 9 is connected to a control cable 11 operable from the aircraft cockpit.

In addition, plate 2 is connected to a control rudder bar 12 for angular orientation, for instance by means of a system of cables, also operable from the aircraft cockpit.

Figure 3:
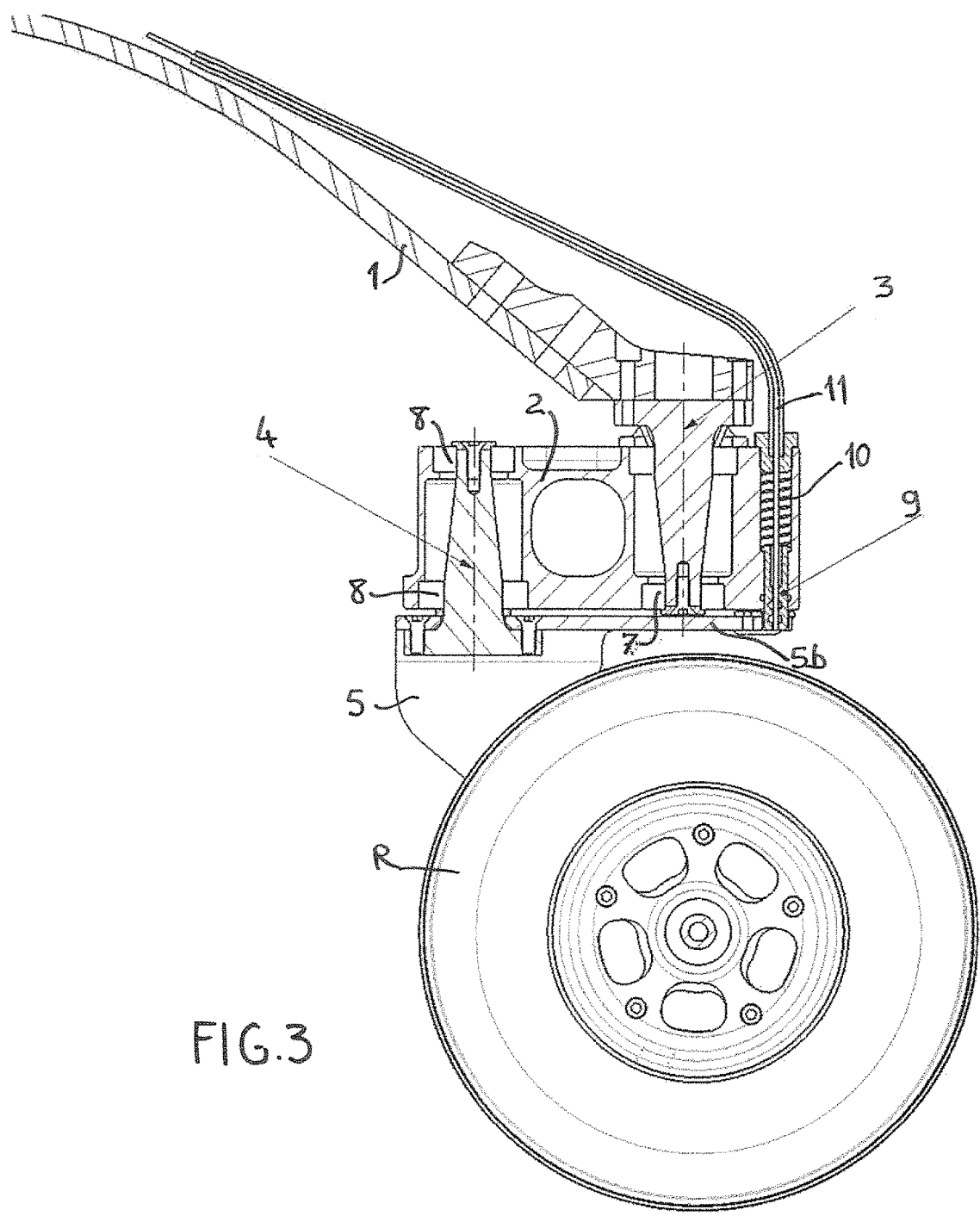
FIG. 3 is a longitudinal sectional view of the device with the fork in the locked position with respect to the plate.
Figure 4:
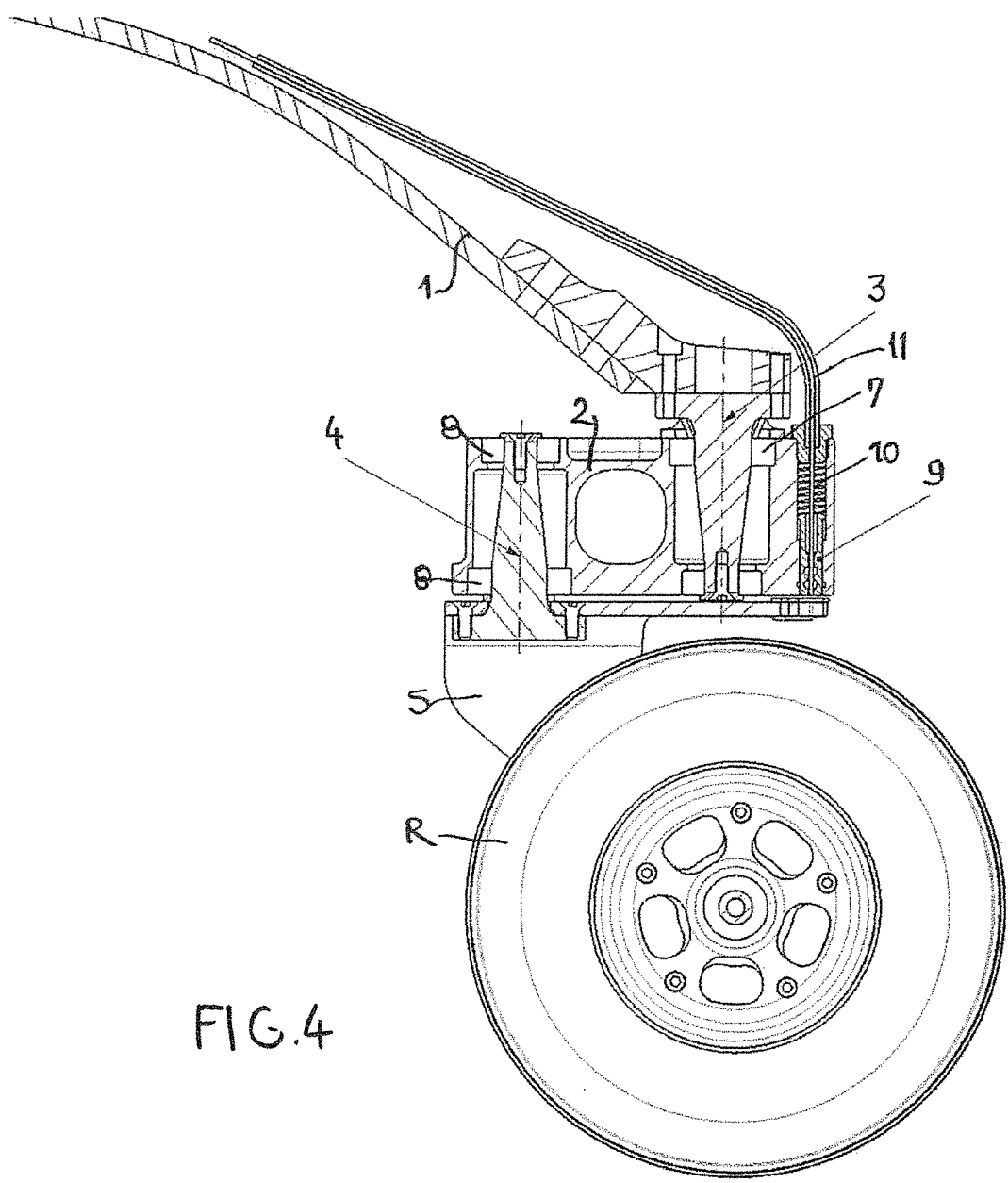
FIG. 4 is a view similar to that of FIG. 3 with the fork in the unlocked position with respect to the plate.
Figure 5:
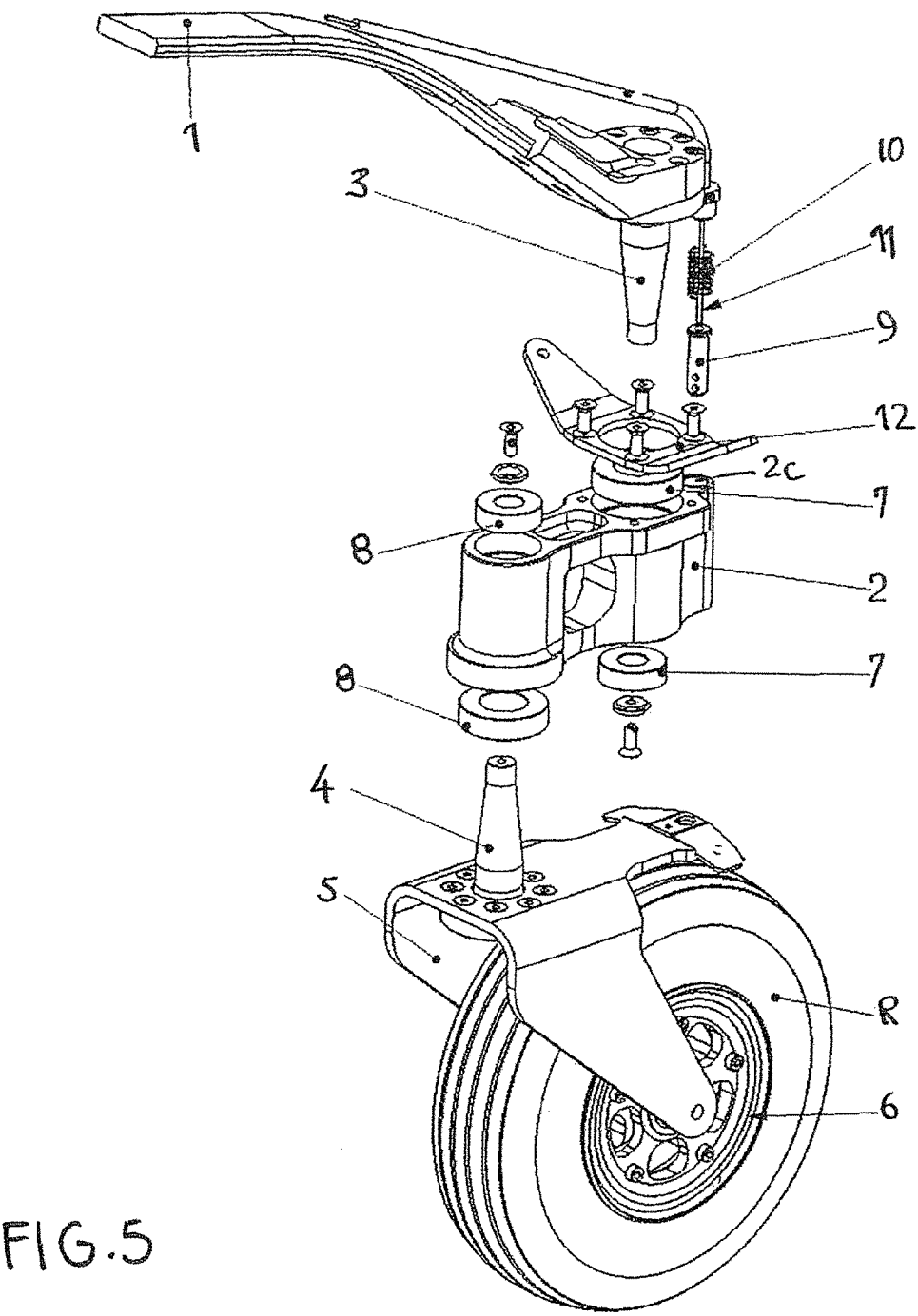
FIG. 5 is a perspective view before the assembly of the main components of the device according to the invention.
Figure 7:
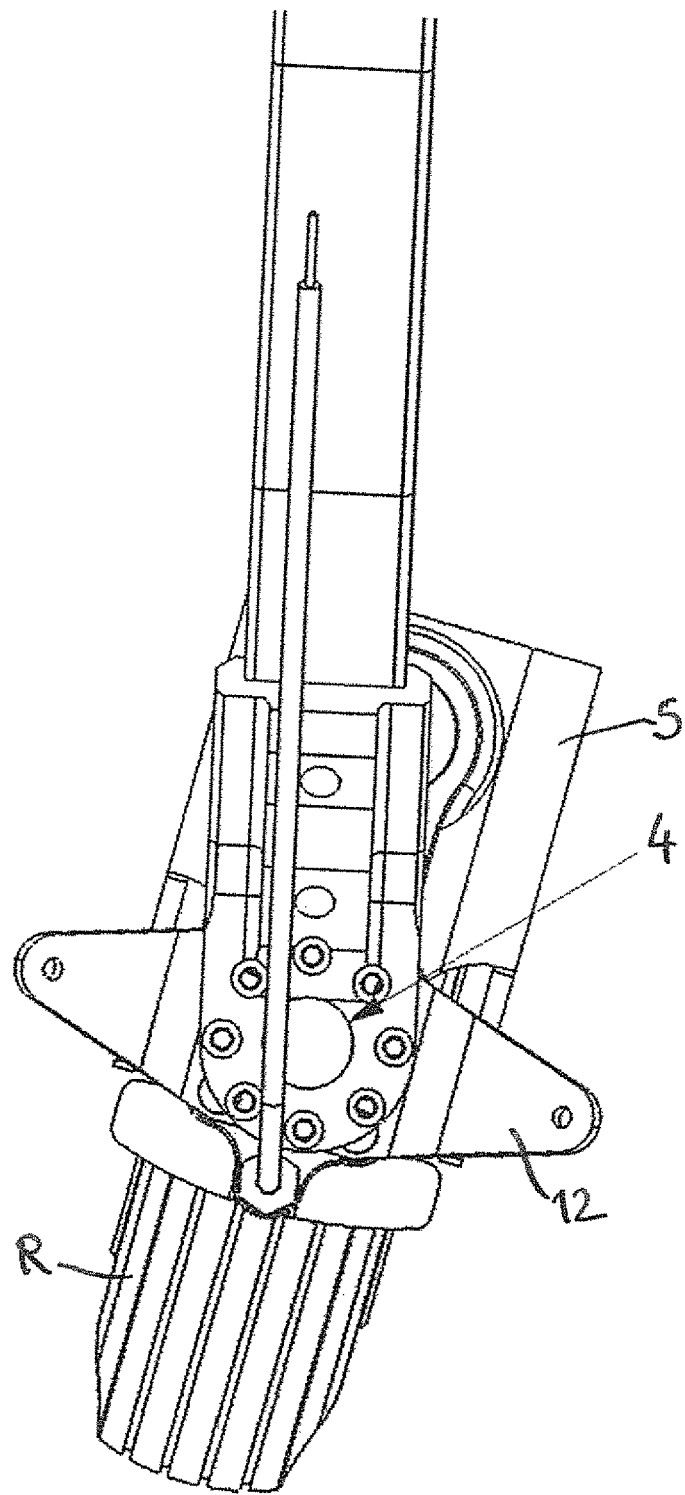
FIG. 7 is a view similar to that of FIG. 6 with the fork receiving the tail wheel in the locked position.

Taking these characteristics into consideration, operation is as follows:

With the tail wheel R in the locked position, the path is fully controlled, this locked position being illustrated in FIGS. 3 and 7. The pin 9 is engaged in fork 5 locking articulation shaft 4 to prevent it from rotating. In this locked position, plate 2 can be controlled angularly with respect to shaft 3 by working, as indicated, on the rudder bar 12. With the tail wheel in this locked position, total taxiing stability will be observed, eliminating any castor phenomenon and any influence of centrifugal force on the steering of the tail wheel. Precise adjustment is obtained on takeoff and landing.

Figure 6:
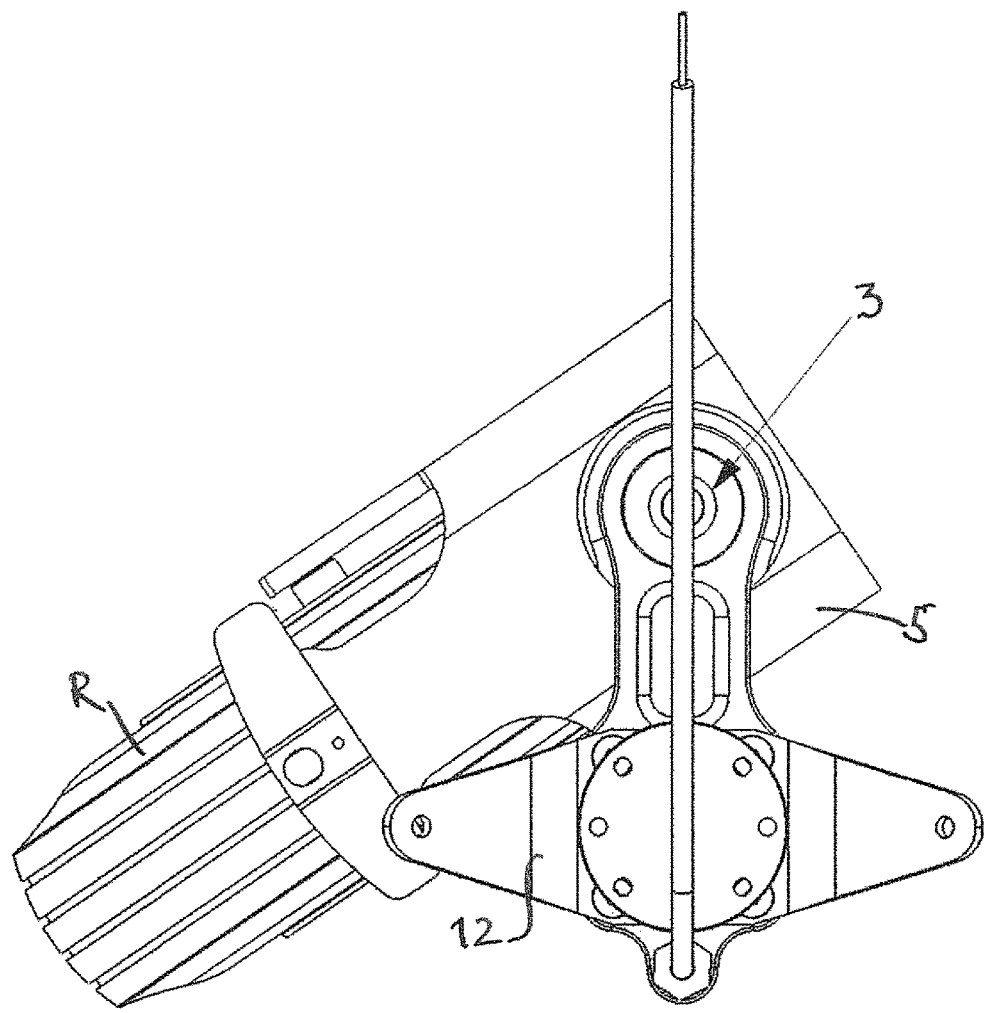
FIG. 6 is a plan view of the device with the fork receiving the tail wheel in the unlocked position to receive the tail wheel.

With the tail wheel in the unlocked position (FIGS. 4 and 6), the pin 9 is retracted so that fork assembly 5, fitted with the tail wheel, is free to rotate with respect to the plate 2. This results in allowing the aircraft the possibility of making a U-turn, with considerable maneuverability, and its easy storage in a hangar.

Therefore, the articulation 3 allows the precise guidance of the aircraft on takeoff and landing whereas the articulation 4, after the unlocking of the fork receiving the tail wheel, allows tight maneuvering by unlocking, for instance, one wheel of the main landing gear.

The advantages are evident in the description.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device for mounting an aircraft tail wheel on an attaching arm made integral with said tail and for preventing loss of aircraft control in a ground loop, wherein the device includes:
    a support plate including a vertical aft bore and a vertical fore bore upstream of the aft bore, the fore bore offset from and parallel to the aft bore;
    a vertical aft articulation shaft mounted in the aft bore and attached to the attaching arm; and
    a vertical fore articulation shaft mounted in the fore bore upstream of the aft articulation shaft, offset from and parallel to the aft articulation shaft, and attached to a fork receiving the freely rotating tail wheel;
    wherein an axis of the aft articulation shaft intersects with a horizontal axis of rotation of the tail wheel; and
    wherein the support plate is connected to a rudder bar arranged around the aft articulation shaft to steer the support plate with respect to the aft articulation shaft.

2. The mounting device according to claim 1, wherein the support plate includes a lock that releasably locks the articulation shaft of the fork.

3. The mounting device according to claim 2, wherein the lock can be operated from the aircraft cockpit.

4. The mounting device according to claim 3, wherein the lock includes a pin mounted against a return spring and mounted to slide freely in a housing of the plate and to be engaged, in the locking position, in a part of the fork with said pin being connected to a control cable operable from the cockpit.

5. The mounting device according to claim 1, wherein the aft articulation shaft is freely rotatable with respect to aft sealed running components and the fore articulation shaft is freely rotatable with respect to fore sealed running components.

* * * * *